Figure 1:
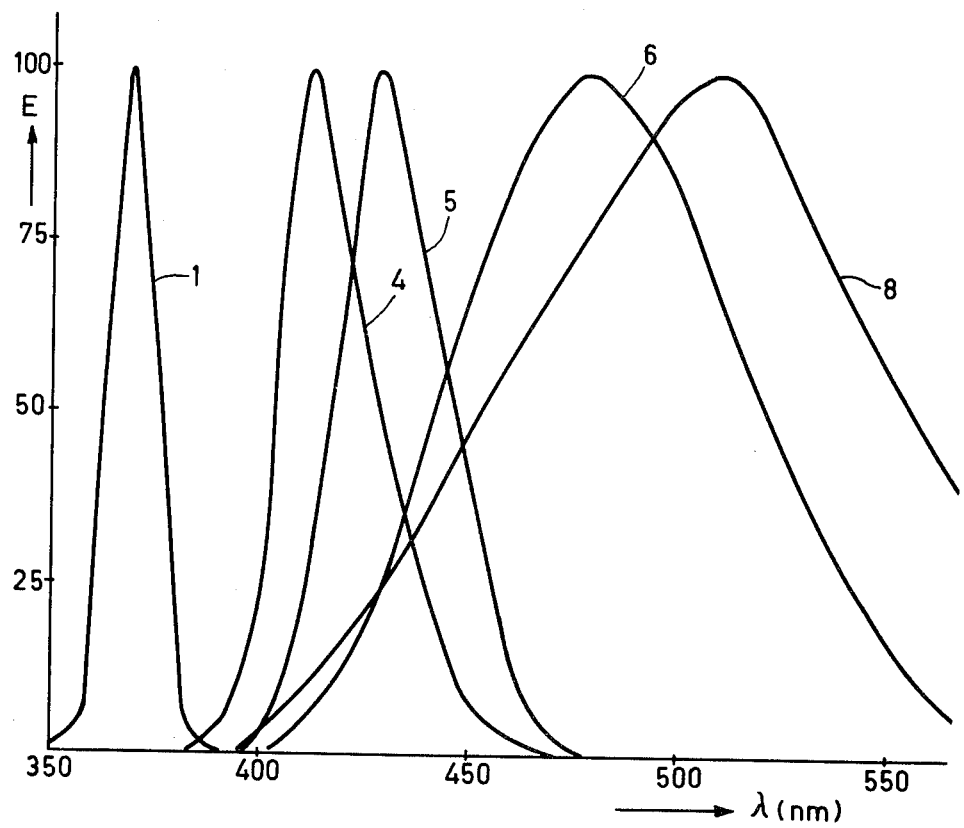

United States Patent [19]

Verstegen et al.

[11] 4,049,992

[45] Sept. 20, 1977

[54] BERYLLIUM-CONTAINING EUROPIUM ACTIVATED PHOSPHATE PHOSPHOR, LUMINESCENT SCREEN AND DISCHARGE LAMP CONTAINING SAME

[75] Inventors: Judicus Marinus Pieter Jan Verstegen; Willebrordus Hubertus Martinus Maria van de Spijker; Emiel Petrus Juliaan de Meester, all of Eindhoven, Netherlands

[73] Assignee: U.S. Philips Corporation, New York, N.Y.

[21] Appl. No.: 472,282

[22] Filed: May 22, 1974

[30] Foreign Application Priority Data

June 1, 1973 Netherlands ............................ 737627

[51] Int. Cl.$^2$ .......................... C09K 11/46; H01J 1/63
[52] U.S. Cl. ............................. 313/486; 252/301.4 P; 428/532; 428/539
[58] Field of Search ................. 252/301.4 P; 313/486; 428/432, 539

[56] References Cited

U.S. PATENT DOCUMENTS

| 2,752,313 | 6/1956 | Wollenton | 252/301.4 P |
| 3,516,940 | 6/1970 | Lagos | 252/301.4 P |
| 3,544,483 | 12/1970 | Lagos | 252/301.4 P |

OTHER PUBLICATIONS

Lagos, "J Electro Chem Soc.", vol. 117, No. 9, Sept. 1970, pp. 1189–1193.

*Primary Examiner*—Jack Cooper
*Attorney, Agent, or Firm*—Frank R. Trifari; Norman N. Spain

[57] ABSTRACT

A luminescent beryllium-containing phosphate activated by bivalent europium defined by the formula $Me_{a-x}Be_bEu_xP_2O_8$ where $a + b = 3$ and $0.01 \leq x \leq 0.25$ and $b$ has the value 1 or 2. If $b = 2$, Me mainly represents one of the alkaline earth metals barium, strontium and calcium. If $b = 1$, Me mainly represents barium and/or strontium.

The luminescent phosphate may be used in mercury vapor discharge lamps and in low-pressure cadmium vapor discharge lamps.

14 Claims, 4 Drawing Figures

BERYLLIUM-CONTAINING EUROPIUM ACTIVATED PHOSPHATE PHOSPHOR, LUMINESCENT SCREEN AND DISCHARGE LAMP CONTAINING SAME

The invention relates to a luminescent screen provided with a luminescent beryllium-containing phosphate. Furthermore the invention relates to mercury vapour discharge lamps and cadmium vapour discharge lamps provided with such a luminescent screen, and to the said luminescent phosphate itself.

A luminescent beryllium-containing phosphate is known from United Kingdom Patent Specification No. 701,031. This specification describes orthophosphates of aluminum and at least one of the metals from the second group of the periodical system and activated by trivalent cerium. Notably such an orthophosphate of aluminum and beryllium is stated.

The use of the element europium in a bivalent form as an activator in luminescent materials is known and in many cases it gives rise to an efficient emission in a comparatively narrow band located in the near ultraviolet or in the blue part of the spectrum. The most important use of these materials is in discharge lamps. United Kingdom Patent Specification No. 1,188,412, for example, describes alkaline earth pyrophosphates activated by bivalent europium. Alkaline earth orthophophosphates activated by bivalent europium are described, for example, in U.S. Pat. No. 3,513,346.

Many practical uses require a luminescent material having an efficient narrow band emission whose maximum is located, dependent on the specific use, at a very specific place in the long-wave ultraviolet or blue part of the spectrum. Therefore it is important to have a large number of such luminescent materials available so that the optimum luminescent material can be chosen for each use.

An object of the invention is to provide novel luminescent materials having an efficient narrow band emission in the above-mentioned range of the spectrum. The invention furthermore provides novel luminescent materials having an emission in the blue-green and green parts of the spectrum.

According to the invention a luminescent screen is provided with a luminescent beryllium-containing phosphate and is characterized in that the phosphate is activated by bivalent europium and is defined by the formula $Me_{a-x}Be_bEU_xP_2O_8$, where $a + b = 3$, $0.01 \leq x \leq 0.25$ and $b$ has the value 1 or 2 wherein, if $b = 2$, Me represents one of the alkaline earth metals barium, strontium and calcium and wherein, if $b = 1$, Me represents at least one of the alkaline earth metals barium and strontium.

The fundamental lattice of the luminescent materials according to the invention is, dependent on the chosen values for $a$ and $b$, defined by the formula $MeBe_2P_2O_8$ (if $b = 2$) or by the formula $Me_2BeP_2O_8$ (if $b = 1$).

X-ray diagrams show that the compounds defined by the formula $MeBe_2P_2O_8$ where Me is strontium or calcium are isomorphic and have an orthorhombic crystal symmetry. It has, however, been found that probably no mixed crystals can be formed with $SrBe_2P_2O_8$ and $CaBe_2P_2O_8$. The compound $BaBe_2P_2O_8$ has a hexagonal crystal symmetry (isomorphic with the mineral cymrite) and does not form mixed crystals with $SrBe_2P_2O_8$ and with $CaBe_2P_2O_8$. When manufacturing a luminescent material according to the invention with a fundamental lattice defined by the formula $MeBe_2P_2O_8$ mainly only one of the alkaline earth metals calcium, strontium and barium is chosen for Me. It is to be noted that small replacement (for example up to 10 gram-atomic %) of the alkaline earth metal chosen for Me by one or more of the other alkaline earth metals may be admitted. However, the luminescence properties of the material obtained are then generally influenced detrimentally and such a replacement is preferably not used.

The compounds defined by the formula $Me_2BeP_2O_8$ where Me represents barium or strontium have different crystal structures. The differences are, however, so small that mixed crystals can be obtained with $Ba_2BeP_2O_8$ and $Sr_2BeP_2O_8$ at any Ba:Sr ratio. These mixed crystals also form very efficient luminescent materials upon activation by bivalent europium. Also in this case a small replacement (for example up to 10 gram-atomic %) of barium and/or strontium by calcium may be admitted when manufacturing the luminescent material. Such a replacement does not, however, yield any advantages and is preferably not used.

Only the fundamental lattice defined by the formula $CaBe_2P_2O_8$ is known as a compound (the mineral hurlbutite). The other fundamental lattices according to the above given general formulas and conditions are novel compounds. A compound defined by the formula $Ca_2BeP_2O_8$ was not formed.

Activation of the fundamental lattices by bivalent europium replacing part of the alkaline earth metal denoted by Me yields luminescent materials which can be satisfactorily excited by, for example, X-rays and electrons and particularly by both short-wave and long-wave ultraviolet radiation. The radiation emitted by these materials has a spectral distribution consisting of a band whose maximum is located at a wavelength of between approximately 360 and 520 nm dependent on the choice of the value of $b$ and the choice of the alkaline earth metal denoted by Me.

The europium concentration $x$ in the luminescent phosphate according to the invention may be chosen to be between the values of 0.01 and 0.25. For values of $x$ of less than 0.01 materials having a too low luminous flux are obtained and for values of $x$ of more than 0.25 materials are obtained whose quantum efficiency is too low. The highest luminous fluxes are obtained with luminescent phosphates according to the invention for which $x$ has a value of between 0.02 and 0.15. Therefore, such materials are preferred.

A very advantageous group of luminescent phosphates according to the invention is constituted by the materials defined by the above given general formula where $b = 2$ and Me is barium. These materials have an emission in a very narrow band (half value width approximately 14 nm) with a maximum at approximately 370 nm and are very suitable for use in discharge lamps intended for influencing photochemical reactions, for example, for lacquer hardening and document reproduction. A lamp previously frequently used for such photochemical processes comprises a luminescent lead-activated barium disilicate. As compared with this known material the phosphate herein described according to the invention has the advantage that the emitted radiation energy is concentrated in a narrow band whose peak height is approximately three times as high as that of the known silicate. Consequently a larger concentration of the radiation energy at the wavelengths which are optimum for the photochemical process is obtained with the phosphate according to this invention. A further advantage is the favourable location of the emission maximum in the spectrum namely at larger wavelengths compared with the known silicate so that the emitted radiation is better transmitted by the glass types commonly used for discharge lamps.

The luminescent phosphates according to the invention where $b = 2$ and Me is barium are preferably used in mercury vapour discharge lamps. Since these phosphates are eminently excited by short-wave ultraviolet radiation these lamps are preferably low-pressure mercury vapor discharge lamps with predominantly 254 nm excitation. However, it has been found that these materials can likewise be used satisfactorily in high-pressure mercury vapour discharge lamps in which they convert the 254 nm and 313 nm radiation into long-wave ultraviolet radiation. It is a special advantage that these phosphates have a very favourable temperature dependence of the luminous flux. At a temperature of 500° C the luminous flux of these materials is still approximately 100% of the luminous flux at room temperature.

The luminescent phosphates according to the invention where $b = 2$ and Me is barium are furthermore satisfactorily excited by electrons. Therefore they can advantageously be used in double coated screens of cathode ray tubes. The phosphate is provided in a first luminescent coating located opposite the electron gun of the cathode-ray tube. The emitted radiation of this first coating then serves to excite a second luminescent coating located on the side of the first coating remote from the electron gun.

The luminescent phosphates according to the invention satisfying the above-defined general formula where $b = 2$ and Me is mainly strontium or calcium have a narrow band emission with a maximum at approximately 410 or 430 nm. These materials may be used in low-pressure mercury vapour discharge lamps which are used in photochemical processes, for example, in photochemical document reproduction.

Another preferred group of luminescent phosphates according to the invention consists of the materials defined by the above given general formula where $b = 1$ and Me consists for at least 75 gram-atomic % of barium. These luminescent material have an efficient, comparatively broadband, emission in the green-blue part of the spectrum with a maximum at approximately 480 nm when they are excited by ultraviolet radiation, particularly short-wave ultraviolet radiation. Therefore they are very suitable for use, together with other luminescent materials, in low pressure mercury vapour discharge lamps for general illumination purposes in order to obtain a colour correction of the radiation emitted by these lamps.

A group of luminescent phosphates according to the invention which is furthermore preferred comprises the materials defined by the general formula where $b = 1$ and Me consists for at least 75 gram-atomic % of strontium. These materials have an efficient emission in a broad band in the green part of the spectrum with a maximum at approximately 510 nm. Since these materials according to the invention have a broad excitation spectrum and also a favourable temperature dependence of the luminous flux, they can advantageously be used both in low-pressure and high-pressure mercury vapour discharge lamps to obtain a colour correction of the radiation emitted by these lamps. As a result of their favourable excitation spectrum and temperature dependence of the luminous flux these phosphates can furthermore be used in low-pressure cadmium vapour discharge lamps in which they make a colour correction of the emitted radiation possible.

The luminescent phosphates according to the invention are preferably manufactured by means of a solid state reaction at an elevated temperature. The starting point is a mixture of the composite oxides or of compounds which yield these oxides upon heating (for example, hydrophosphates and/or carbonates of the alkaline earth metals and diammonium phosphate). This mixture is heated for some time at a high temperature, for example, 900° to 1250° C in a weakly-reducing atmosphere. It is advantageous to perform the heat treatment in several stages with the reaction product being ground and sieved after each treatment. It is often advantageous to subject the reaction mixture to a pre-heat treatment at a relatively low temperature, for example, at 700° C in air.

As is generally known, it is often advantageous in the synthesis of luminescent materials to introduce the composite components into the reaction mixture in quantities which deviate from the stoichiometrically determined quantities. An excess of one or more of the composite constituents may enhance the formation reaction of the luminescent material and/or may have a favourable influence on the grain properties of the material obtained. It has been found that also for the luminescent phosphates according to the invention deviations from stoichiometrically yield advantage when manufacturing these phosphates. Notably an excess of beryllium up to approximately 25 gram-atomic % and a deficiency of phosphorus up to approximately 10 gram-atomic % is used. The luminescent phase obtained satisfies the stoichiometrical formula. An excess which may still be present of one or more of the composite components does not have any substantial influence on the properties of the actual luminescent phase.

Figure 2:
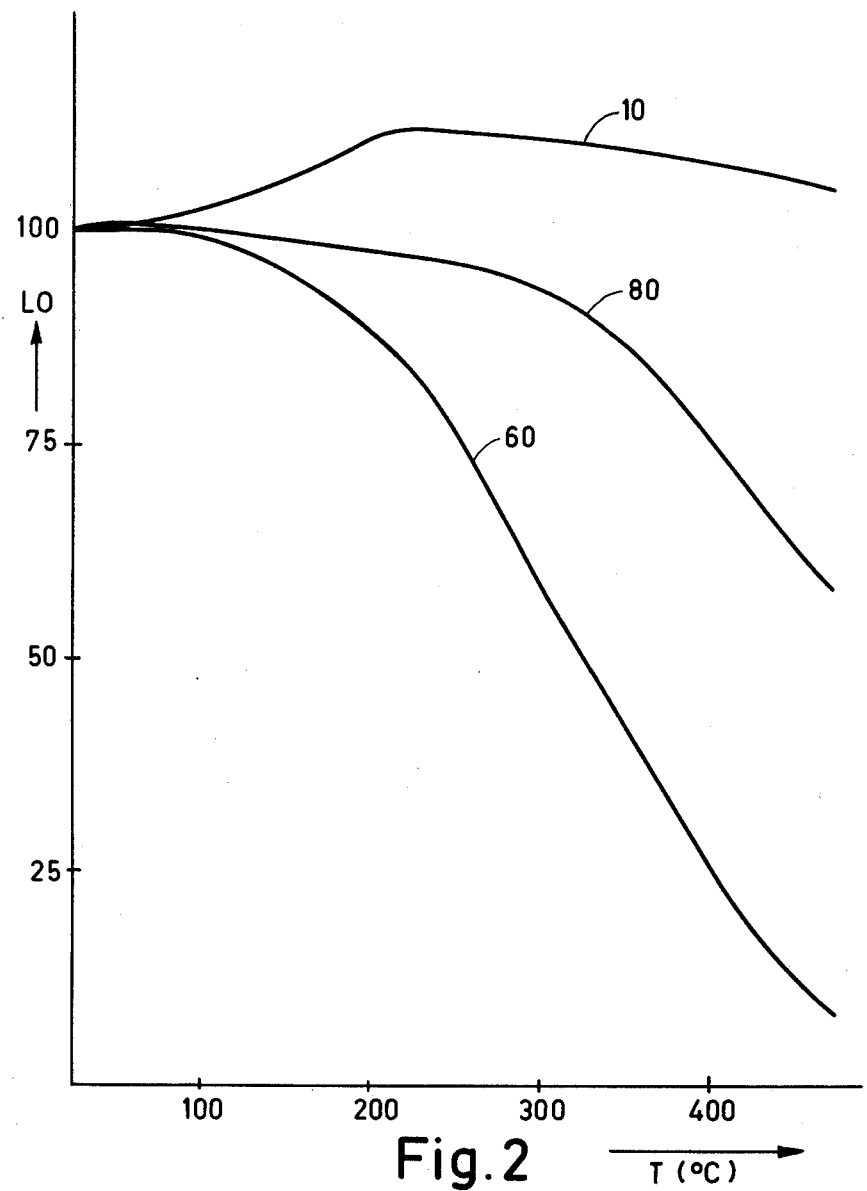

The invention will now be described in greater detail with reference to an example, a number of measurements and a drawing. In the drawing FIG. 1 shows in a graph the spectral distribution of the emitted radiation of a number of luminescent phosphates according to the invention and FIG. 2 shows the temperature dependence of some luminescent phosphates according to the invention.

Figure 3:
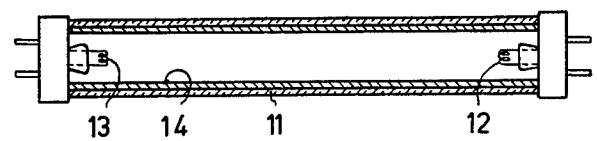
Figure 4:
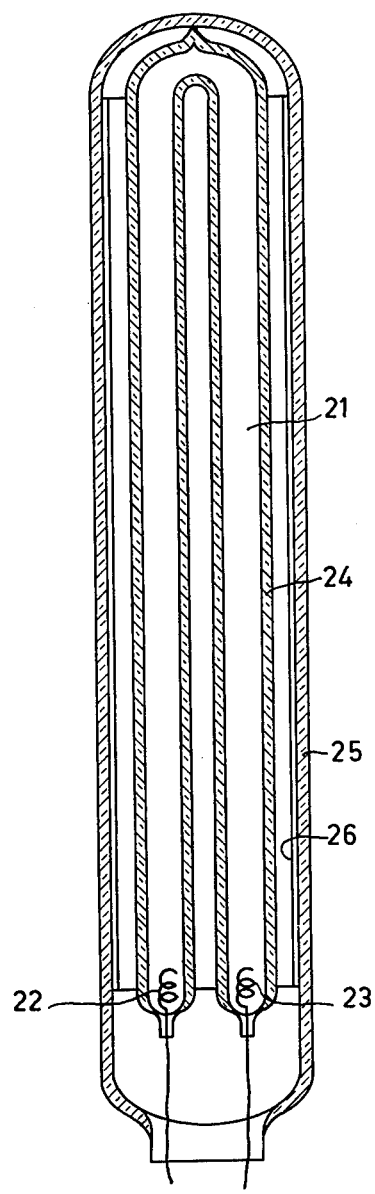

FIG. 3 diagrammatically shows a mercury vapour discharge lamp employing a luminescent material according to the invention and FIG. 4 shows a low pressure cadium vapour discharge lamp employing a luminescent material according to the invention.

EXAMPLE

A mixture is made of:
17.76 g $BaCO_3$
5.00 g BeO
24.40 g $(NH_4)_2HPO_4$
0.176g $Eu_2O_3$.

This mixture is introduced into a quartz crucible and heated in air in a furnace for 1 hour at 700° C. After cooling the product is pulverized and subsequently twice heated for 1 hour at 100° C in a weakly reducing atmosphere. This atmosphere may be obtained by passing a mixture of nitrogen and some % by volume of hydrogen into the furnace. After each heat treatment the reaction product is ground and sieved. The final product consists of a luminescent phosphate activated by bivalent europium defined by the formula $Ba_{0.9}$.

$Ba_{0.90}Eu_{0.10}Be_2P_2O_8$. The emission spectrum of this material upon excitation by short-wave ultraviolet radiation (predominantly 254 nm) is shown in FIG. 1 (curve 1). The emission maximum is located at approximately 370 nm and the half value width of the emission band of this material according to the invention is found to be almost three times as high as that of the known lead-activated barium disilicate which has its maximum emission at approximately 350 nm and a half value width of the emission band of approximately 35 nm. Upon excitation by electrons the energy conversion efficiency of the material manufactured in accordance with this example is 8%.

In a manner analogous to that described in the above-mentioned example a number of embodiments of luminescent phosphates according to the invention was obtained. The following table I states the results of measurements on these phosphates. The table states for each example in addition to the formula of the relevant phosphate the height of the luminous flux (LO) in % relative to a standard upon excitation by short-wave ultraviolet radiation (predominantly 254 nm). As a standard is used a luminescent calcium halophosphate activated by antimony and manganese which is mixed with non-luminescent calcium carbonate in such quantities that the luminous flux of halophosphate has been reduced by approximately 50% of the original value. The table states under A the value of the absorption of the exciting ultraviolet radiation in % relative to the absorption of ZnO. The table also states the location of the maximum emission in the spectrum ($\lambda_{max}$) and the half value width of the emission band (hwb) in nm.

TABLE I

| Ex. | Formula | LO(%) | A (%) | $\lambda max$ (nm) | hwb (nm) |
|---|---|---|---|---|---|
| 1 | $Ba_{0.98}Eu_{0.02}Be_2P_2O_8$ | 75 | 75 | 370 | 14 |
| 2 | $Ba_{0.95}Eu_{0.05}Be_2P_2O_8$ | 110 | 86 | 370 | 14 |
| 3 | $Ba_{0.90}Eu_{0.10}Be_2P_2O_8$ | 137 | 96 | 370 | 14 |
| 4 | $Sr_{0.95}Eu_{0.05}Be_2P_2O_8$ | 105 | 92 | 412 | 25 |
| 5 | $Ca_{0.95}Eu_{0.05}Be_2P_2O_8$ | 110 | 77 | 428 | 30 |
| 6 | $Ba_{1.95}Eu_{0.05}BeP_2O_8$ | 209 | 88 | 478 | 79 |
| 7 | $Ba_{1.45}Sr_{0.50}Eu_{0.05}BeP_2O_8$ | 191 | 89 | 485 | 88 |
| 8 | $Sr_{1.95}Eu_{0.05}BeP_2O_8$ | 221 | 89 | 510 | 100 |

Deviations from stoichiometry in the manufacture of the luminescent phosphates according to the invention may have a favourable influence on the luminous flux produced by these phosphates. Table II below states by way of example the luminous flux LO (in % relative to the standard already mentioned) of luminescent materials defined by the formula $Ba_{1.95}Eu_{0.05}BeP_2O_8$ which manufactured from firing mixtures whose beryllium content $p$ deviates from the stoichiometrical value 1.

TABLE II

| $p$ | LO (%) |
|---|---|
| 0.9 | 199 |
| 1.0 | 209 |
| 1.1 | 219 |
| 1.25 | 228 |
| 1.5 | 217 |

FIG. 1 shows the spectral energy distribution of some luminescent phosphates according to the invention upon excitation by short-wave ultraviolet radiation. Curves 1, 4, 5, 6 and 8 relate to the materials of examples 1, 4, 5, 6 and 8, respectively, of table I. The wavelength $\lambda$ is plotted in nm. on the horizontal axis and the radiation energy E per constant wavelength interval is plotted in arbitrary units on the vertical axis. The maximum radiation energy is fixed at 100 for each curve.

FIG. 2 shows in a graph the relative luminous flux (LO) of three materials according to the invention as a function of the temperature (T) in °C. The luminous flux at room temperature is fixed at 100 for each material. Curves 10, 60 and 80 relate to the materials of examples 1, 6 and 8, respectively, of table I. These graphs show that these materials have a very favourable temperature dependence of the luminous flux. For the material according to example 1 the value of the luminous flux at room temperature is even completely maintained up to temperatures of more than 500° C.

FIG. 3 shows a low-pressure mercury vapour discharge lamp which includes an envelope 11. Electrodes 12 and 13 between which the discharge takes place during operation of the lamp, are provided at the ends of the lamp. The inner side of the envelope 11, which is made of, for example, glass is coated with a luminescent layer 14 which contains a luminescent material according to the present invention. The luminescent material may be provided on the envelope 11 by bringing a suspension of the luminescent material and nitrocellulose in butyl acetate into contact with the inner side of the envelope, whereby a thin layer of the suspension is left on the envelope. The nitrocellulose serves as a temporary adhesive. Then the envelope is subjected to a thermal treatment by which the temporary adhesive is removed and a satisfactory adhesion of the luminescent layer is obtained.

Referring to FIG. 4, reference numeral 21 designates a low-pressure cadmium-vapour discharge tube having the form of a U. 22 and 23 designate the cathodes. In the embodiment shown the wall 24 of this discharge tube is made of vitreous quartz. The discharge tube is surrounded by an outer bulb 25, for example, of hard glass. 26 designates a layer of luminescent material applied to the inner side of the outer bulb 25. The discharge tube 21 contains cadmium-vapour and a rare gas or a rare-gas mixture for starting the discharge and for improving the output.

What is claimed is:

1. A luminescent screen provided with a luminescent beryllium-containing phosphate, wherein the phosphate is activated by bivalent europium and is defined by the formula $Me_{a-x}Be_bEu_xP_2O_8$ where $a + b = 3$, $0.01 \leq x \leq 0.25$, and $b$ has the value of 1 or 2 and in which, if $b = 2$, Me represents barium and in which, if $b = 1$, Me represents at least one of the alkaline earth metals selected from the group consisting of barium and strontium.

2. A luminescent screen as claimed in claim 1, characterized in that $0.02 \leq x \leq 0.15$.

3. A luminescent screen as claimed in claim 1 characterized in that $b$ 23 2, and Me is barium.

4. A mercury vapour discharge lamp provided with a luminescent screen as claimed in claim 3.

5. A luminescent screen as claimed in claim 1, characterized in that $b = 1$ and at least 75 gram-atomic % of Me is barium.

6. A low-pressure mercury vapour discharge lamp provided with a luminescent screen as claimed in claim 5.

7. A luminescent screen as claimed in claim 1, characterized in that $b = 1$ and at least 75 gram-atomic % of Me is strontium.

8. A mercury vapour discharge lamp provided with a luminescent screen as claimed in claim 7.

9. A low-pressure cadmium vapour discharge lamp provided with a luminescent screen as claimed in claim 7.

10. A luminescent beryllium-containing phosphate activated by bivalent bivalent europium and defined by the formula: $Me_{2-x}Be_bEU_xP_2O_8$ in which $a + 3$, $0.01 \leq x \leq 0.25$ and $b$ has the value 1 or 2, in which, if $b = 2$, Me is barium and in which, if $b = 1$, Me is at least one of the alkaline earth metals selected from the group consisting of barium and strontium.

11. The luminescent phosphate of claim 10 wherein $0.02 \leq x \leq 0.15$.

12. The luminescent phosphate of claim 11 wherein $b = 2$ and Me is barium.

13. The luminescent phosphate of claim 11 wherein $b = 1$ and at least 75 gram atom % of Me is barium.

14. The luminescent phosphate of claim 11 wherein $b = 1$ and at least 75 gram atom % of Me is strontium.

* * * * *

United States Patent and Trademark Office
CERTIFICATE OF CORRECTION

PATENT NO. : 4,049,992
DATED : September 20, 1977
INVENTOR(S) : JUDICUS MARINUS PIETER JAN VERSTEGEN It is certified that error appears in the above-identified patent and that said Letters Patent are hereby corrected as shown below:

In the Title page, Item [30], "737627" should be --7307627--

Column 7, line 6, "EU" should be -- Eu --.

Signed and Sealed this

Twenty-third Day of May 1978

[SEAL]

Attest:

RUTH C. MASON
Attesting Officer

LUTRELLE F. PARKER
Acting Commissioner of Patents and Trademarks